United States Patent [19]

Moore et al.

[11] Patent Number: 5,566,985
[45] Date of Patent: Oct. 22, 1996

[54] FIBERGLASS PIPE WITH ROUGH WRENCH SURFACES

[76] Inventors: Lawrence P. Moore, 49 Cascade Springs, The Woodlands, Tex. 77381; John P. Biro, 1707 Woodland Park, Houston, Tex. 77077

[21] Appl. No.: 279,401

[22] Filed: Jul. 25, 1994

[51] Int. Cl.$^6$ .................................................. F16L 35/00
[52] U.S. Cl. ........................... 285/39; 285/328; 285/423; 285/919; 138/146; 264/131
[58] Field of Search .......................... 166/77.5; 285/39, 285/328, 423, 919; 264/131; 138/145, 146; 428/36.1, 36.2, 36.4, 1.50

[56] References Cited

U.S. PATENT DOCUMENTS

| | | | |
|---|---|---|---|
| 657,605 | 9/1900 | Lacy | 138/146 |
| 2,876,154 | 3/1959 | Usab | 285/919 X |
| 3,258,032 | 6/1966 | Whittier et al. | 138/146 |
| 3,325,195 | 6/1967 | Margis | 285/328 X |
| 3,498,827 | 3/1970 | Vanderbilt et al. | 138/145 |
| 3,638,968 | 2/1972 | Barks | 285/328 X |
| 3,682,676 | 8/1972 | Karrh et al. | 138/146 X |
| 5,063,969 | 11/1991 | Snyder | 138/145 X |
| 5,213,379 | 5/1993 | Taniguchi | 285/919 X |
| 5,233,737 | 8/1993 | Policelli | 285/423 X |
| 5,352,309 | 10/1994 | Oswald | 285/423 X |

*Primary Examiner*—Dave W. Arola
*Attorney, Agent, or Firm*—Bush, Moseley, Riddle & Jackson

[57] ABSTRACT

A fiberglass pipe joint with threaded ends has rough surface areas adjacent to such ends which allow strap wrenches to be used to tighten the threads with a high torque that prevents leakage. The rough areas are formed by partially embedded sand grains which are sprinkled on the resin component prior to curing, or on a wet bonding material after curing.

4 Claims, 1 Drawing Sheet

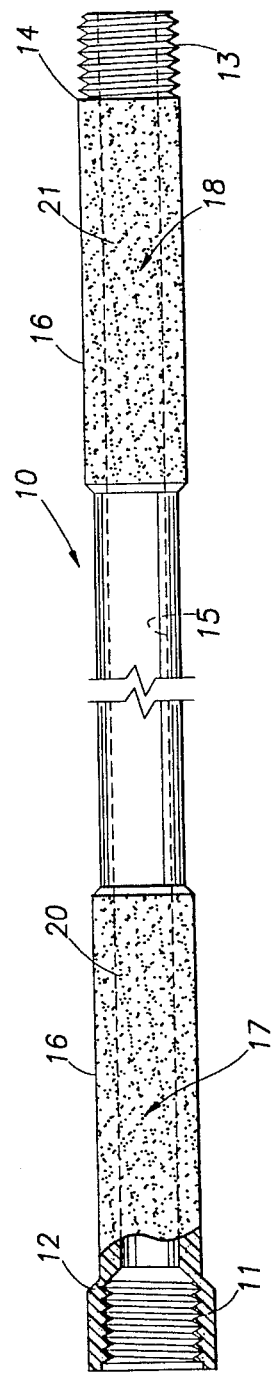
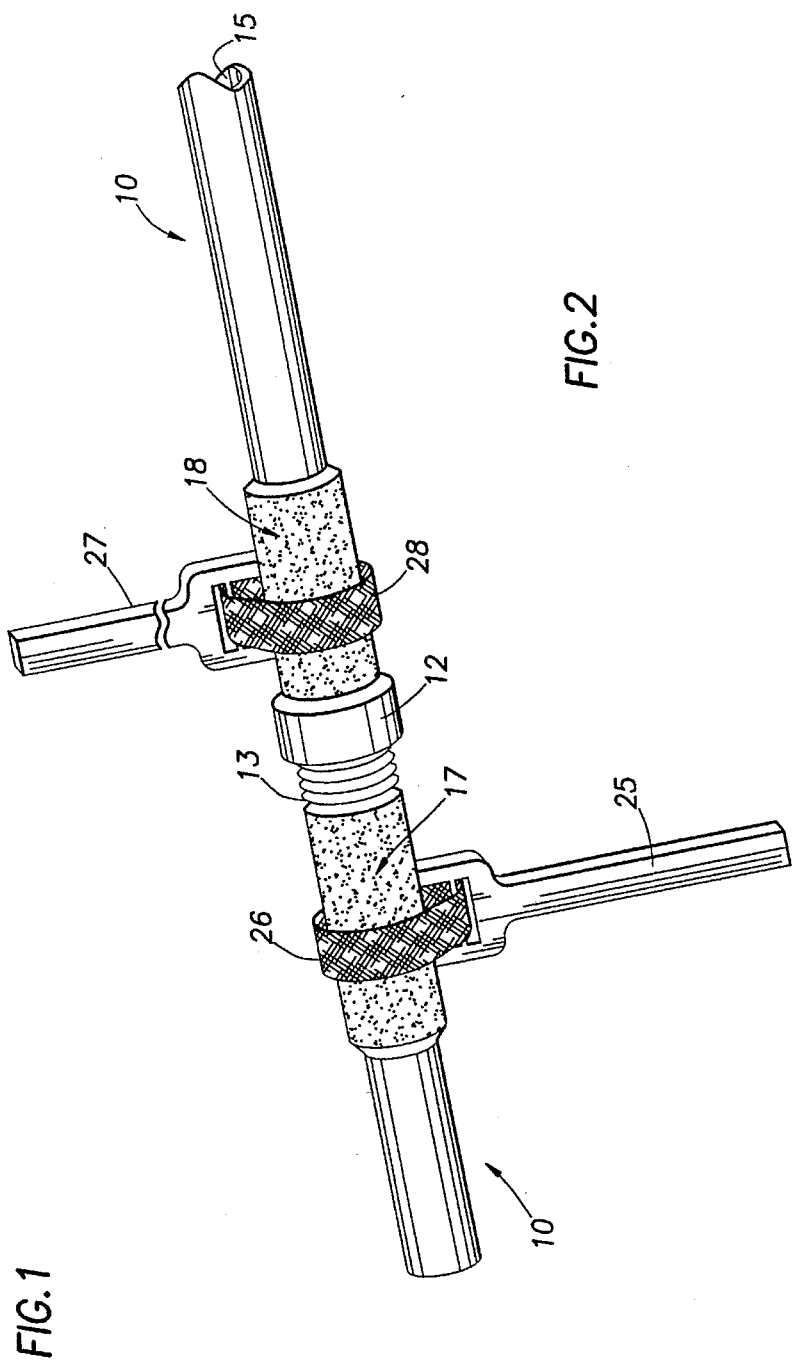

FIBERGLASS PIPE WITH ROUGH WRENCH SURFACES

FIELD OF THE INVENTION

This invention relates generally to high pressure fiberglass pipe with threaded joints that is used in the oil, chemical and other industries, and particularly to pipe of this type where the threaded connections must be adequately tightened to prevent leaks.

BACKGROUND OF THE INVENTION

All high pressure fiberglass pipe joints have threaded connections at their ends, for example a male thread on one end and a female thread on the other. The joints are placed end-to-end and the connections made up until the destination of the pipeline is reached. In order to avoid leaks at the connections, each male thread must be screwed very tightly into a female thread. The amount of required tightness typically is expressed as a level of torque in ft-pounds on the male threaded end. If the female end is held fixed in position while the male end is screwed into it, the moment applied to the male thread, which is the same as the resisting moment of the female thread, is the torque applied across the threaded connection. Of course larger diameter pipes require much more make-up torque than smaller diameter pipes, and the level of torque required for each size of pipe usually is specified by the manufacturer.

In order to properly tighten the threaded connections on fiberglass pipe by applying the specified torque, one of two special wrench-like tools is employed. For smaller pipe sizes, a hand tool commonly called a "strap wrench" is used. This wrench is a relatively simple device having a steel bar or lever about two feet long with a buckle built into its inner end. A tough fabric strap is attached to the buckle, passes around the pipe, and then extends back through the buckle in a manner such that force on the lever tightens the strap around the pipe and transfers rotation force thereto as the lever is rotated. Larger size pipes usually are tightened with power tongs having dies. This is a very complicated piece of equipment which works hydraulically rather than manually. Power tongs also grip the plastic pipe with some form of belt system.

Where pipe is made of steel, typical pipe wrenches can be used to make up threaded connections on smaller sizes, and hydraulic power tongs having hardened steel dies which grip the pipe can be used on larger sizes. However these tools are totally inappropriate for use on fiberglass pipe because the steel teeth and dies cause excessive damage to the less tough fiberglass material.

It should be recognized that fiberglass pipe has a smooth, glassy external surface that is free of any roughness or abrasive texture. As a consequence, the belts of both the strap wrench and the power tongs have a tendency to slip during the threaded tightening process. This presents a time consuming and frustrating problem during installation of a pipeline on account of delays and inaccuracies in the amount of torque actually applied to the connections. Much research and development has been done on power tongs and strap wrenches to provide improved belt gripping systems which will not slip on fiberglass surfaces or bite or gouge the pipe, however the problems remain so that such devices are only marginally adequate for the job.

An object of the present invention is to provide new and improved fiberglass pipe joints which are constructed and arranged to overcome the above-mentioned thread tightening problems.

Another object of the present invention is to provide a new and improved fiberglass pipe joint having rough external surface areas adjacent the threaded connections so that the usual strap wrenches and power tongs can be used make the connections up to specified torque levels.

SUMMARY OF THE INVENTION

These and other objects are attained in accordance with the concepts of the present invention through the provision of a fiberglass pipe manufacturing process, and the product of such process, wherein prior to curing and while the resin component of the fiberglass is still liquid, two extend circumferential areas near the respective opposite ends of the pipe are salted with a light coating of abrasive particles such as sand grains. The grains partially imbed themselves in the surface of the pipe, which at this point is a thick viscous liquid. The pipe then is cured to its hardened final state leaving the sand grains exposed enough to provide rough surface areas. The grains are molded into the pipe in a manner such that they will not detach. Alternatively, the abrasive material is applied to the cured pipe by roughing the areas with sandpaper and then applying a coating of epoxy bonding material to each surface. The sand grains then are sprinkled over the wet bonding material, which is allowed to harden. In either case abrasive areas are provided which can be securely gripped by a strap wrench or power tong so that threaded connections can be torqued to a specified level which does not leak under pressure.

BRIEF DESCRIPTION OF THE DRAWINGS

The present invention has the above as well as other objects, features and advantages which will become more clearly apparent in connection with the following detailed description of preferred embodiments, taken in conjunction with the appended drawings in which:

FIG. 1 is a side view of a fiberglass pipe joint showing abrasive grit applied to external surface areas adjacent to the threads; and FIG. 2 is an isometric view showing a threaded connection being made up with strap wrenches.

DETAILED DESCRIPTION OF PREFERRED EMBODIMENTS

FIG. 1 shows a joint of fiberglass pipe 10 having female threads 11 inside a box 12 on one end, and male threads 13 on a pin 14 on the opposite end. The pipe 10 has an internal bore 15 of a given nominal or drift size, and an external diameter 16 which provides a sufficient wall thickness to give the pipe a specified pressure rating. External surfaces 17, 18 adjacent the respective threads 11 and 13 have a slightly enlarged outer diameter to provide stronger sections which are about 12–18 inches long. The overall length of the joint 10 typically is about 30 feet. The threads 11, 13 can be any standard type.

Prior to curing during the manufacturing process, and while the resin component of the fiberglass is still liquid, the two surface areas 17, 18 are salted or sprinkled with a light coating of said grains 20, 21. These two areas are where the strap wrench or power tongs will be applied later to make up the threads 11, 13 as shown in FIG. 2. The sand grains partially embed themselves into the surfaces 17, 18 while these surfaces are a thick viscous liquid having about the same consistency as honey. The pipe joint 10 then is cured to its hardened final state leaving the said grains exposed enough to provide a rough abrasive surface. At this point the grains 20, 21 will have been molded into the pipe 10 and cannot detach.

With further reference to FIG. 2, the pipe joints 10 are shown being connected end-to-end by threading the male threads 11 at the end of one joint into the female threads 13 on the adjacent end of another joint. A strap wrench 27 having its belt 28 positioned around the rough surface 18 is used to hold the threads 11 from turning, while another strap wrench 25 having a belt 26 around the rough surface 17 is used to tighten the threads 13 until the specified level of torque is achieved. Except for the rough surfaces 17, 18, the balance of the external surfaces of each pipe joint 10 are smooth and glossy so that a grip thereon is very difficult, if not impossible, to obtain.

Through use of the present invention, the connection between the threads 11, 13 can be made leak-proof since a significant level of torque can be applied. The strap wrenches 25, 27 will obtain more than adequate purchase on account of the roughened surfaces 17, 18 to deliver the necessary make-up torque, although the fiberglass material itself is not tough enough to withstand the operation of gripping devices which bit into the pipe surfaces. The other surfaces which are not modified in accordance with this invention are smooth and glassy such that wrenches which do not bite into these surfaces loose their grip and fail to tighten the threaded joints, which then leak under pressure.

As an alternative form of the present invention, the sand grains 20, 21 are applied after the pipe joint 10 is fully cured to its hardest state. After each curing the surface areas 17, 18 are roughened with sandpaper. Then a coating of epoxy bonding material is applied to such surfaces, after which sand grains are sprinkled over the wet bonding material. Finally the bonding material is allowed to harden with the sand grains partially embedded therein.

It now will be recognized that a new and improved fiberglass pipe manufacturing process and product have been disclosed where the finished pipe joint has rough external areas adjacent each threaded end which allow strap wrenches and belt power tongs to be used to make up leakproof connections. Since certain changes or modifications may be made in the disclosed embodiments without departing from the inventive concepts involved, it is the aim of the appended claims to cover all such changes and modifications falling within the true spirit and scope of the present invention.

What is claimed is:

1. A joint of fiberglass pipe comprising: an elongated tubular body having threaded ends; and external surface areas adjacent each of said threaded ends having particulate abrasive material only partially embedded therein.

2. The pipe joint of claim 1 wherein each of said external surface areas are cylindrical and has a length in the range of from 12 to 18 inches.

3. The pipe joint of claim 2 wherein each of said cylindrical external surface areas has an outer diameter that is greater than the outer diameter of said pipe joint between said surfaces.

4. The pipe joint of claim 1 wherein said abrasive material is constituted by grains of sand.

\* \* \* \* \*